United States Patent [19]
Pande et al.

[11] 3,718,684
[45] Feb. 27, 1973

[54] METHOD FOR SYNTHESIZING ALPHA-HALOACRYLONITRILE ACID

[75] Inventors: Kailash C. Pande; George M. Trampe, both of Parkersburg, W. Va.

[73] Assignee: Borg-Warner Corporation, Chicago, Ill.

[22] Filed: Oct. 7, 1969

[21] Appl. No.: 864,540

[52] U.S. Cl. ............... 260/465.7, 260/486, 260/539, 260/561 N
[51] Int. Cl. .............................................. C07c 121/16
[58] Field of Search .................................... 260/465.7

[56] References Cited

UNITED STATES PATENTS 2,245,547   6/1941   Pollack ............................... 260/486
2,673,875   3/1954   Anspon ......................... 260/465.7 X

OTHER PUBLICATIONS

Morrison and Boyd, Organic Chemistry, Boston: Allyn and Bacon, Inc. 1966 page 732.

Primary Examiner—Lewis Gotts
Assistant Examiner—C. F. Warren
Attorney—Donald W. Banner, William S. McCurry and John W. Butcher

[57] ABSTRACT

A method of preparing α-haloacrylic acid and derivatives thereof from dihalopropionic acid and derivatives using aqueous ammonium hydroxide or anhydrous ammonia. The reaction proceeds by dehydrohalogenation of the dihalo compound to provide the α-halo compound.

2 Claims, No Drawings

METHOD FOR SYNTHESIZING ALPHA-HALOACRYLONITRILE ACID

BACKGROUND OF INVENTION

There have been a great variety of methods utilized in preparing α-haloacrylic acid derivatives such as α-haloacrylonitrile. Perhaps the most prevalently used methods are the dehalogenation of saturated halogenated nitriles, i.e., those nitriles containing from about three to eight carbon atoms. As a result of the economics involved in the preparation of α-halo compounds, it is important that any given method prepare the compound under reaction conditions capable of obtaining relatively high yields. This is necessary to make the process economically feasible. An example of at least one method of dehalogenation of saturated halogenated nitriles is set forth in copending U.S. Pat. application Ser. No. 834,151 wherein the dehalogenation of α, α, β-trihalopropionitrile is conducted through the addition of a trialkyl phosphite. Also, a second method of preparing α-haloacrylonitrile is set forth in U.S. Pat. No. 2,384,889 wherein the dehalogenation occurs in the presence of a magnesium complex to provide the α-haloacrylonitrile. When referring to α-haloacrylic acid compounds herein, it is meant that either α-chloro or α-bromo compounds are prepared and not meant to include α-iodo-compounds.

SUMMARY OF INVENTION

The instant invention is directed to the preparation of α-haloacrylic acid or derivatives thereof from dihalopropionic acid or derivatives using aqueous ammonium hydroxide (25–35 percent solution) or ammonia, in accordance with the equation set forth hereinbelow. The reaction may be carried out at a temperature of from about 0°–30° and satisfactory yields may be obtained at about room temperature. The yields may extend from 25 to 80+ percent, i.e., moderate to high yields. The reaction proceeds as follows:

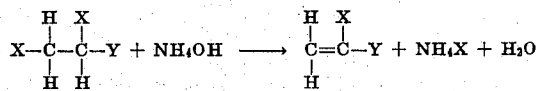

wherein X is halogen selected from the group consisting of chlorine and bromine and Y is selected from the group consisting of:

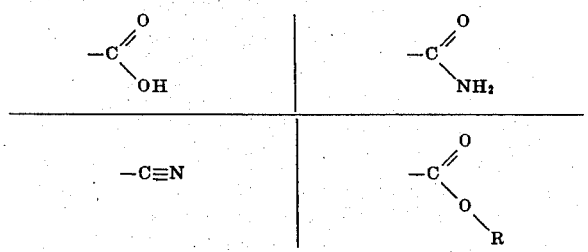

wherein R is $C_1$–$C_8$ alkyl

The reaction is very facile and the ammonium hydroxide (or ammonia) is added slowly to a solution of dihalopropionic acid, or derivative, kept in an ice bath. Upon completion of the reaction, the α-haloacrylic acid or derivative layer is separated and distilled or otherwise purified, to obtain 99+ percent pure α-haloacrylic acid or derivative. The use of ammonia makes the process very attractive economically.

It should be noted that the dihalopropionic acid or derivative is placed in an aqueous solution of ammonia under certain reaction conditions; however, when dry ammonia is used, any suitable organic solvent may be used. Several solvents are illustrated in the examples and it has been found that ethers, alcohols and aromatics, such as benzene, are useful. The alcohol, it will be noted, is not as efficient as acetone and other solvents.

The reaction will be more clearly understood in view of the following examples which illustrate the invention. All parts are by weight unless otherwise indicated.

EXAMPLE 1

124.2g 2,3-dichloropropionitrile (1 mole) and 5g hydroquinone were charged to a three-necked flask equipped with stirrer, condenser, addition funnel and a thermometer. The mixture was cooled to 20°C and 120g aqueous ammonium hydroxide (30 percent solution) was added dropwise. An exothermic reaction occurred and $NH_4Cl$ started forming immediately.

The reaction mixture was cooled by external cooling and the temperature was maintained below 30°C throughout the addition of $NH_4OH$ which took place over about a 1 hour period. Upon completion of the addition of $NH_4OH$, 100 ml of water were added. The organic layer was separated, dried over $Na_2SO_4$ and distilled. A total of 63g, (0.72 mole) 72 percent yield, of pure α-chloroacrylonitrile (bp 85°–89°C), was obtained. NMR and IR spectra confirmed the purity of the product. A portion of black resinous material was left as pot residue.

The dehydrohalogenation reaction can also be carried out using anhydrous ammonia (either liquid or gas, but preferably gas). The reaction will proceed as set forth hereinbelow. The ammonium chloride formed by the reaction can be filtered off.

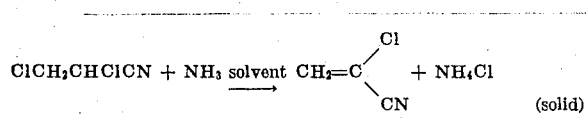

The following example will illustrate the above step.

EXAMPLE 2

8.0g dry ammonia gas was bubbled into a solution of α,β-dichloropropionitrile (50.0g in 75 ml of diethyl ether) containing about 0.25g hydroquinone at room temperature, i.e., about 26°C. A white precipitate of ammonium chloride formed immediately. After complete addition of ammonia (about 1 hour), ammonium chloride was filtered. The filtrate on fractionation yielded α-chloroacrylonitrile in greater than 80 percent yield.

EXAMPLE 3

213g of α,β-dibromopropionitrile and 5g hydroquinone was charged to a three-necked flask equipped with stirrer, condenser, addition funnel, and a thermometer. The mixture was cooled to 20°C and ammonium hydroxide (30 percent; 100 ml) was added dropwise. An exothermic reaction occurred and the mixture was cooled by external cooling. The temperature was maintained below 30°C. After complete addition of $NH_4OH$, 100 ml water was added. The organic layer was separated, dried over Na$_2$SO$_4$ and distilled. A total of 63g (0.72 mole) 72 percent yield of pure α-bromoacrylonitrile was obtained; bp 55°C/20 mm. NMR and IR spectra confirmed the purity of the product. A dark colored resinous mass was left as pot residues. The total reaction time was about 1½ hours.

EXAMPLE 4

4.0 ml of 30% aqueous ammonia was added to a solution of 10.0g (0.071 mole) of α,β-dichloropropionamide in 50 ml of acetone. The mixture was stirred for 1½ hours at room temperature, i.e., about 26°C. The ammonium chloride was removed by filtration, and acetone was removed from the filtrate by evaporation. The residue was recrystallized from chloroform, yielding 4.0g (63 percent) α-chloroacrylamide.

EXAMPLE 5

12.8g (0.75 mole) of dry ammonia was added to a solution of 85g (0.5 mole) of ethyl α,β-dichloropropionate in 100 ml of methylene chloride and the reaction mixture was maintained at about 30°-35C. All the ammonia was added and stirring was continued overnight at room temperature, i.e., about 26°C. The mixture was filtered and the methylene chloride was removed from the filtrate by distillation at atmospheric pressure. Distillation of the residue yielded 54g (80 percent) of ethyl α-chloroacrylate, bp 51°-55/17 mm.

EXAMPLE 6

8.5g (0.5 mole) of dry ammonia was added to a solution of 70g (0.5 mole) of α,β-dichloropropionamide in ethyl alcohol and the temperature was reduced to 5°-10C for about 1 hour. When the ammonia addition was complete, the mixture was stirred for an additional 2 hours at 26°C., i.e., room temperature, filtered, and the solvent removed by evaporation. Recrystallization of the residue from chloroform yielded 13g (25 percent) α-chloroacrylamide. The yield in ethyl alcohol was not as high as in acetone.

EXAMPLE 7

17g (1.0 mole) of ammonia was added to a solution of 71g (0.5 mole) of α,β-dichloropropionic acid in ethanol and the reaction mixture was maintained at room temperature, i.e., 26°C. After stirring overnight at room temperature, 18g (0.5 mole) of dry HCl was added, the mixture was filtered, and the solvent was removed by evaporation. Recrystallization of the residue from chloroform gave 32g (60 percent yield) α-chloroacrylic acid.

EXAMPLE 8

5.1g (0.3 mole) of anhydrous ammonia was added to a solution of 63.5g (0.25 mole) of 2-ethylhexyl α,β-dichloropropionate in 100 ml of absolute ethanol at room temperature. After stirring overnight at room temperature, ammonium chloride was filtered off, ethanol was evaporated from the filtrate, and the residue was distilled, yielding 38g (70 percent yield) of 2-ethylhexyl α-chloroacrylate.

EXAMPLE 9

10.2g (0.6 mole) of anhydrous ammonia was added to a solution of 78g (0.5 mole) of methyl α,β-dichloropropionate in 150 ml of methanol at room temperature. After stirring overnight at room temperature, ammonium chloride was filtered off, methanol was distilled from the filtrate at atmospheric pressure, and the residue was distilled at reduced pressure. 45.0g (75 percent yield) of methyl α-chloroacrylate was obtained.

The examples illustrate the versatility of the method of the instant invention; however, the examples are not meant to in any way limit the scope of the invention. The scope of the invention is defined solely by the appended claims which should be construed as broadly as is consistent with the prior art.

We claim:

1. A method of preparing α-haloacrylonitrile consisting of the step of dehydrohalogenating dihalopropionitrile of the formula:

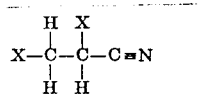

wherein X is halogen selected from the group consisting of chlorine and bromine; said dehydrohalogenating step being the placing of said dihalopropionitrile in a suitable ether solvent along with polymerization inhibitor such as hydroquinone and reacting said dihalopropionitrile with anhydrous ammonia reagent at a temperature of 20°-30°C and separating the resultant α-haloacrylonitrile from the solution.

2. The method of Claim 1 wherein X is chlorine and the solvent is diethylether.

* * * * *